United States Patent
Malhotra et al.

(10) Patent No.: US 10,686,662 B2
(45) Date of Patent: Jun. 16, 2020

(54) ROLE-BASED ATTACHMENT TO OPTIMAL WIRELESS NETWORK CORES IN A MULTI-ROLE WIRELESS COMMUNICATION NETWORK

(71) Applicant: Sprint Communications Company L.P., Overland Park, KS (US)

(72) Inventors: Rajil Malhotra, Olathe, KS (US); Chidambaram Pavanasam, Overland Park, KS (US); Eric C. English, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 120 days.

(21) Appl. No.: 15/606,880

(22) Filed: May 26, 2017

(65) Prior Publication Data
US 2018/0343167 A1   Nov. 29, 2018

(51) Int. Cl.
  H04L 12/24   (2006.01)
  H04W 48/18   (2009.01)
  H04L 12/26   (2006.01)
  H04L 29/06   (2006.01)

(52) U.S. Cl.
  CPC ........ *H04L 41/0893* (2013.01); *H04L 43/065* (2013.01); *H04W 48/18* (2013.01); *H04L 41/12* (2013.01); *H04L 63/102* (2013.01)

(58) Field of Classification Search
  CPC ... H04W 4/005; H04W 84/042; H04W 84/12; H04W 28/02; H04W 48/18; H04W 72/04; H04W 72/0493; H04W 72/08; H04W 72/087; H04W 24/02; H04L 41/12; H04L 47/10; H04L 47/70; H04L 41/0893; H04L 43/065; H04L 63/102; H04L 41/0892
  USPC ........................................................ 370/235
  See application file for complete search history.

(56) References Cited

U.S. PATENT DOCUMENTS

| | | | |
|---|---|---|---|
| 8,144,696 B2 | 3/2012 | Kallio et al. | |
| 8,626,234 B2 | 1/2014 | Miller | |
| 9,001,682 B2 | 4/2015 | Kovvali et al. | |
| 9,179,465 B2 | 11/2015 | Dimou et al. | |
| 9,351,282 B2 | 5/2016 | Freda et al. | |
| 9,426,728 B2 | 8/2016 | Draznin et al. | |
| 9,603,001 B1 | 3/2017 | Malhotra et al. | |
| 9,756,597 B1 * | 9/2017 | Park | H04W 76/15 |
| 9,949,146 B1 * | 4/2018 | Velusamy | H04W 24/02 |
| 2011/0176530 A1 | 7/2011 | Vikberg et al. | |

(Continued)

FOREIGN PATENT DOCUMENTS

| | | |
|---|---|---|
| EP | 2421302 A1 | 2/2012 |
| WO | 2016180018 A1 | 11/2016 |

*Primary Examiner* — Jeffrey M Rutkowski
*Assistant Examiner* — Sudesh M Patidar

(57) ABSTRACT

A wireless access point is linked to multiple wireless network cores. The wireless access point wirelessly transmits a multi-role wireless network identifier for a multi-role network. The wireless access point wirelessly receives device attachment signaling indicating a device role from the wireless user device responsive to the multi-role wireless network identifier. The wireless access point processes the device role to select the optimal one of the wireless network cores from the multiple wireless network cores. The wireless access point transfers network attachment signaling for the wireless user device to the selected and optimal wireless network core.

20 Claims, 5 Drawing Sheets

(56) References Cited

U.S. PATENT DOCUMENTS

| | | | |
|---|---|---|---|
| 2012/0046034 A1* | 2/2012 | Lu | H04W 48/18 455/435.2 |
| 2016/0007331 A1 | 1/2016 | Gauba et al. | |
| 2016/0094395 A1* | 3/2016 | Hu | H04W 28/16 370/254 |
| 2016/0219476 A1 | 7/2016 | Onishi et al. | |
| 2016/0249335 A1* | 8/2016 | Liu | H04W 48/18 |
| 2016/0323842 A1 | 11/2016 | Dinan | |
| 2017/0164135 A1* | 6/2017 | Kodaypak | H04W 4/70 |
| 2018/0310215 A1* | 10/2018 | Watfa | H04W 36/385 |

\* cited by examiner

ROLE-BASED ATTACHMENT TO OPTIMAL WIRELESS NETWORK CORES IN A MULTI-ROLE WIRELESS COMMUNICATION NETWORK

TECHNICAL BACKGROUND

Data communication networks serve user communication devices with user data services like internet access, media conferencing, machine communications, social networking, and the like. To extend the range and mobility of these user data services, the data communication networks deploy wireless access networks. The wireless access networks have wireless access points that communicate over the air with wireless communication devices. The wireless communication devices could be computers, phones, media players, machine transceivers, and the like.

The wireless access networks also have wireless network cores with mobility controllers, data gateways, user databases, and other network elements. Current wireless access networks attach wireless communication devices to the wireless network cores based on the user device identity and load-balancing algorithms like round-robin. Long Term Evolution (LTE) networks typically attach User Equipment (UE) to LTE Evolved Packet Cores (EPCs) based on the UE's International Mobile Subscriber Identifier (IMSI) and geographic location.

In some examples, a specific wireless network core is selected based on a user-defined mode. For example, a user work mode directs the attachment of the UE to an employer network core. A user home mode directs the attachment of the UE to the user's home network core. Unfortunately, the user mode approach does not work as well with machine-to-machine communications sometimes called the Internet of Things (IoT). The multitude of IoT applications have a far more diverse set of communication modes than human users. Current wireless access points do not efficiently and effectively select wireless network cores in the rapidly expanding IoT environments.

TECHNICAL OVERVIEW

A wireless access point is linked to multiple wireless network cores. The wireless access point wirelessly transmits a multi-role wireless network identifier for a multi-role wireless communication network. The wireless access point wirelessly receives device attachment signaling indicating a device role from the wireless user device responsive to the multi-role wireless network identifier. The wireless access point processes the device role to select the optimal one of the wireless network cores from the multiple wireless network cores. The wireless access point transfers network attachment signaling for the wireless user device to the selected and optimal wireless network core.

DETAILED DESCRIPTION

Figure 1:
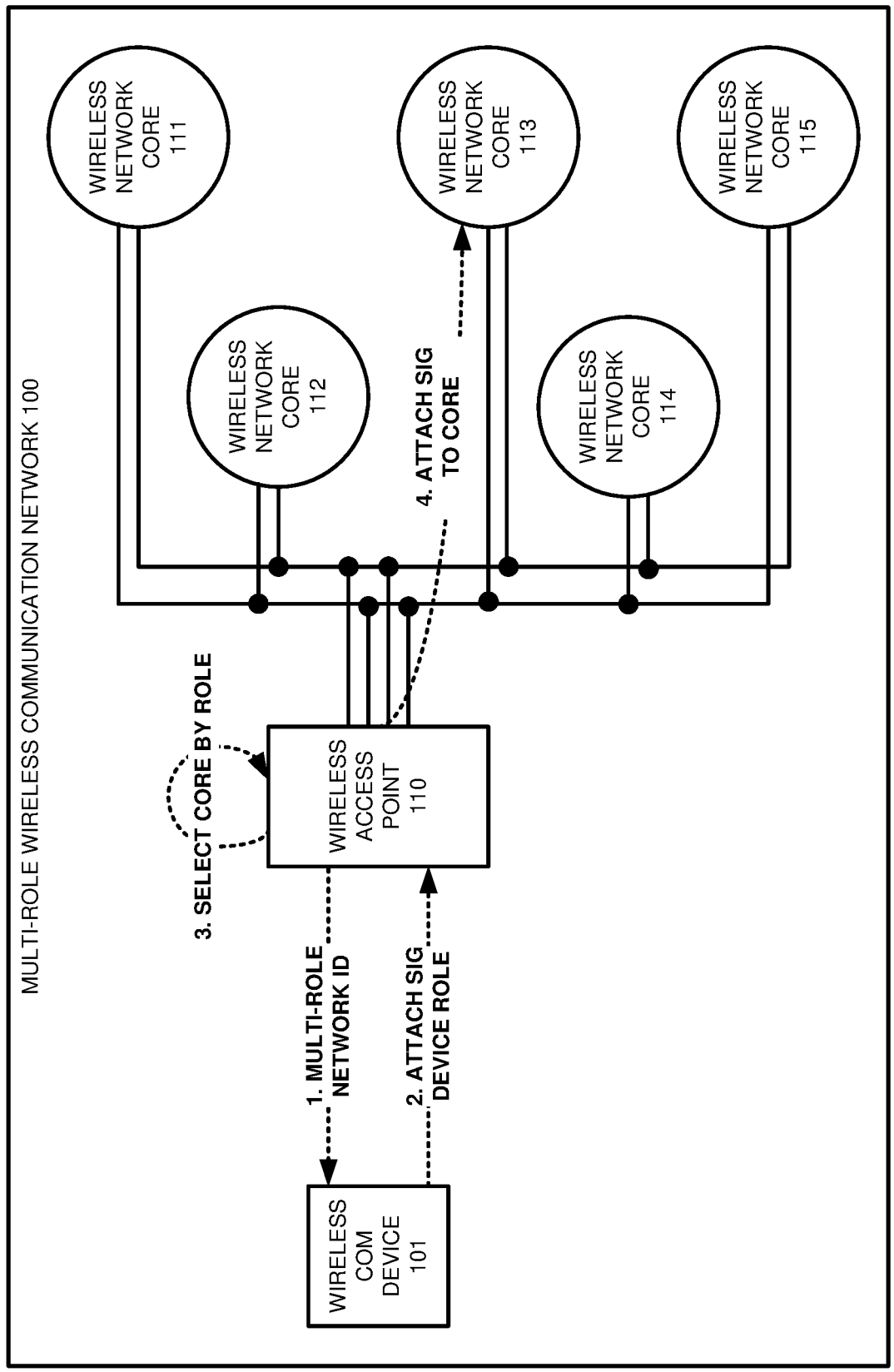
FIGS. 1-2 illustrate a multi-role wireless communication network to attach wireless communication devices to optimal wireless network cores based on wireless communication device roles.
Figure 2:
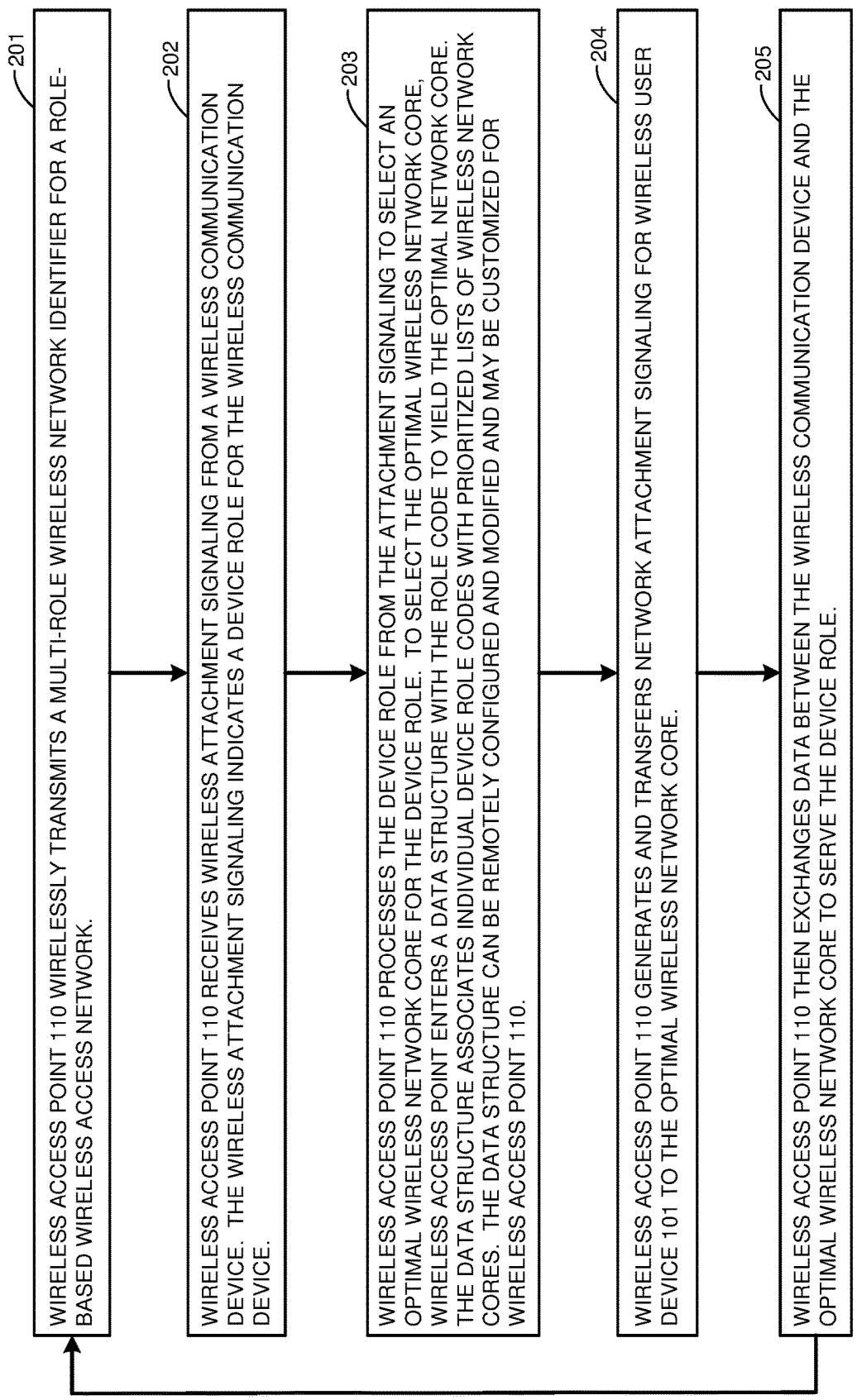

FIGS. 1-2 illustrate multi-role wireless communication network 100 to attach wireless communication device 101 to optimal wireless network core 113 based on the specific device role for wireless communication device 101. Referring to FIG. 1, multi-role wireless communication network 100 comprises wireless communication device 101, wireless access point 110, and wireless network cores 111-115. Wireless communication network 100 delivers wireless data services to wireless communication device 101. Examples of wireless communication device 101 include computers, phones, media players, and machine transceivers. Exemplary wireless data services include Internet access, media conferencing, machine-to-machine IoT communications, and social networking.

Wireless access point 110 is made of computer systems and software. The computer systems have Central Processing Units (CPUs), Random Access Memory (RAM), data storage, Input/Output (I/O) transceivers, and bus interfaces. The CPUs retrieve the software from the memories and execute the software to direct the operation of the user devices. The software comprises modules for operating system, user device control, user data handling, network control, core selection, and the like.

Wireless network cores 111-115 comprise network elements like data gateways, mobility controllers, and user databases. Wireless communication device 101 and wireless access point 110 communicate using protocols such as Institute of Electrical and Electronic Engineers (IEEE) 802.11, Long Term Evolution (LTE), IEEE 802.3, Internet Protocol (IP), and/or some other format. Wireless access point 110 and wireless network cores 111-115 communicate using protocols such as Time Division Multiplex (TDM), IEEE 802.3, Wave Division Multiplexing (WDM), LTE, Internet Protocol (IP), and/or some other format.

The user of wireless communication device 101 may manipulate the user interface to input a device role into wireless communication device 101. Exemplary device roles include: non-human machine with critical communication requirements, non-human machine with non-critical communication requirements, human internet access without an independent voice calling service, human media conferencing, human media downloading, human social networking, non-human environmental sensor, non-human utility meter, non-human vehicle, and non-human wireless relay.

In a first operation, wireless access point 110 wirelessly transmits a wireless network identifier for multi-role wireless communication network 100, such as a Public Land Mobile Network (PLMN) identifier. Wireless communication device 101 receives the multi-role wireless network identifier, and in response to the multi-role network, wireless communication device 101 inserts its device role into its wireless attachment signaling. Wireless communication device 101 may alternatively skip wireless attachment or omit the device role for different wireless network identifiers.

In a second operation, wireless communication device 101 wirelessly transmits attachment signaling to wireless access point that indicates its device role. The attachment signaling could be Long Term Evolution (LTE) Radio Resource Control (RRC) signaling. The device role might be human social networking, non-human and non-critical IoT, or some other device role.

In a third operation, wireless access point 110 processes the device role from the attachment signaling to select an optimal one of wireless network cores 111-115. Wireless network cores 111-115 serve different types of user devices based on their device role. Some network cores may only serve devices having one specific role like content delivery, while other cores might serve many different devices having many different roles like a smartphone.

In one of many exemplary service architectures, wireless network core 111 could serve wireless communication devices that have the role of a non-human machine with critical communication requirements, while wireless network core 112 serves wireless communication devices with the role of a non-human machine with non-critical communication requirements. Environmental sensors, utility meters, wireless relays, and vehicles comprise a few examples of these non-human machines. The critical communication requirements have better network access, quality-of service, data latency, and other data communication metrics than do the non-critical communication requirements. In an exemplary service architecture, wireless network core 113 may serve wireless communication devices that have the device role of internet access without an independent voice calling service, while wireless network cores 114-115 serve respective wireless communication devices having the respective device roles of media conferencing and media downloading. Media conferencing network core 114 might comprise an Internet Protocol Multimedia Subsystem (IMS) and media downloading network core 115 might comprise a downstream Content Delivery Network (dCDN). Other service architectures could be used.

To select the optimal one of wireless network cores 111-115 for wireless communication device 101, wireless access point 110 matches the device role to the optimal core for that device role. In this specific example, the device role is internet access without an independent voice calling service, so wireless access point selects wireless network core 113 that serves user devices having that device role. Examples of independent voice calling services include Voice over LTE, (VoLTE), Code Division Multiple Access (CDMA), Global System for Mobile Communications (GSM), and the like. Examples of dependent voice calling services include Voice over Internet Protocol (VOIP) applications and social networking applications.

In a fourth operation, wireless access point 110 generates and transfers network attachment signaling for wireless user device 101 to the selected and optimal wireless network core. In this example, wireless access point 110 transfers network attachment signaling for wireless user device 101 to optimal wireless network core 113. The network attachment signaling could be an LTE S1-MME Initial UE message.

Referring to FIG. 2, the operation of wireless access point 110 is described. Wireless access point 110 wirelessly transmits a multi-role wireless network identifier for a role-based wireless access network (201). Wireless access point 110 receives wireless attachment signaling from a wireless communication device (202). The wireless attachment signaling indicates a device role for the wireless communication device responsive to the multi-role wireless network identifier. Wireless access point 110 processes the device role from the attachment signaling to select an optimal wireless network core for the device role (203).

To select the optimal wireless network core, wireless access point enters a data structure with the device role to yield the optimal network core. The data structure associates individual device roles with prioritized lists of wireless network cores. The data structure can be remotely configured and modified and may be customized for wireless access point 110. To customize the data structure, any wireless network cores that are available to wireless access point 110 are identified. The device roles supported by these identified wireless network cores are then scored and prioritized by score. The device roles are then mapped to the wireless network cores with the best scores for their device role in the prioritized order.

Wireless access point 110 generates and transfers network attachment signaling for wireless user device 101 to the selected and optimal wireless network core (204). Wireless access point 110 then exchanges data between the wireless communication device and the optimal wireless network core to serve the device role (205). For example, wireless access point 110 may exchange data between a vehicle communication device and a wireless network core that is optimized to serve vehicles. In another example, wireless access point 110 may exchange data between a utility meter and a wireless network core that is optimized to serve non-critical IoT communications. In yet another example, wireless access point 110 may exchange data between a wireless social networking device and a wireless network core that is optimized to serve the social network.

Figure 3:
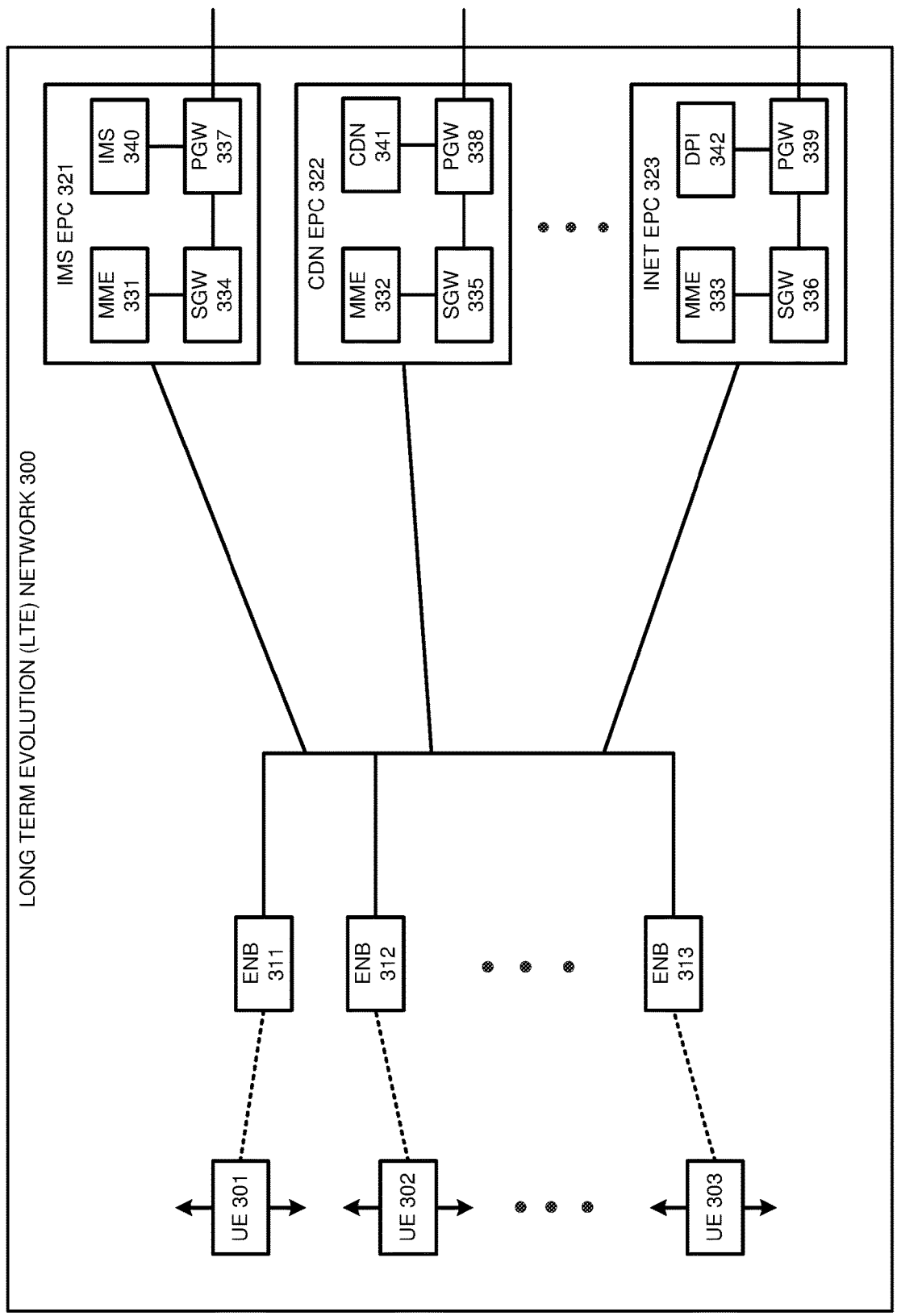
FIGS. 3-4 illustrate a multi-role Long Term Evolution (LTE) network to attach User Equipment (UE) to optimal LTE Evolved Packet Cores (EPCs) based UE roles.

FIG. 3 illustrates Long Term Evolution (LTE) network 300 to attach User Equipment (UE) 301-303 to optimal LTE Evolved Packet Cores (EPCs) 321-323 based UE roles. LTE network 300 comprises UEs 301-303, eNodeBs (ENBs) 311-313, and Evolved Packet Cores (EPCs) 321-323. Internet Protocol Multimedia Subsystem (IMS) EPC 321 serves media conferencing UEs with IMS services. Content Delivery Network (CDN) EPC 322 serves media downloading UEs with content delivery services. Internet (INET) EPC 323 serves internet UEs with internet access services. IMS EPC 321 comprises Mobility Management Entity (MME) 331, Serving Gateway (S-GW) 334, Packet Data Network Gateway (P-GW) 337, and IMS servers 340. CDN EPC 322 comprises MME 332, S-GW 335, P-GW 338, and CDN servers 341. INET EPC 323 comprises MME 333, S-GW 336, P-GW 339, and Deep Packet Inspection (DPI) servers 342.

UEs 301-303 are each configured with a role-based Public Land Mobile Network Identifier (PLMN ID) and a device role. The device roles for this specific PLMN ID are IMS, CDN, and INET—although other roles could be used. ENBs 311-313 each host data a structure that associates the IMS device role with IMS EPC 321, the CDN device role with CDN EPC 322, and the INET device role with INET EPC 323. ENBs 311-313 broadcast the role-based PLMN ID. UEs 301-303 respond to this specific PLMN ID by transferring LTE Radio Resource Control (RRC) attachment signaling to ENBs 311-313 that indicates their individual device role.

ENBs 311-313 process the device roles from the RRC attachment signaling to select the optimal EPCs 321-323. If the RRC attachment signaling indicates a media conferencing device role, then ENBs 311-313 transmit the S1-MME initial UE attachment signaling to MME 331 in IMS EPC 321. If the RRC attachment signaling indicates a media downloading device role, then ENBs 311-313 transmit the S1-MME initial UE attachment signaling to MME 332 in CDN EPC 322. If the RRC attachment signaling indicates an internet device role, then ENBs 311-313 transmit the S1-MME initial UE attachment signaling to MME 333 in INET EPC 323. Additional device cores and device roles could be used. For example, an optimized social networking EPC with social networking servers could be added to serve social networking wireless user devices.

Figure 4:
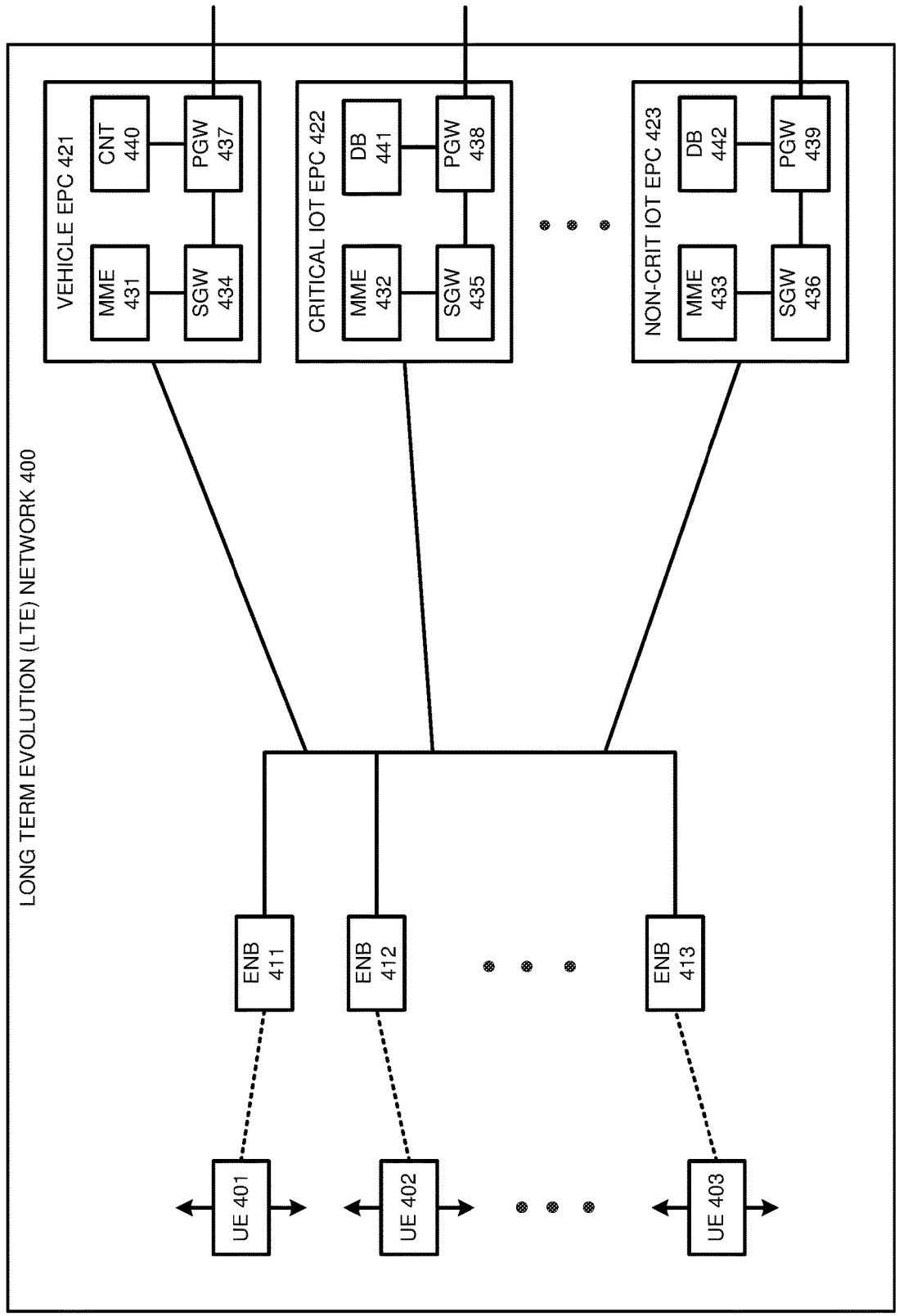

FIG. 4 illustrates LTE network 400 to attach UEs 401-403 to optimal LTE EPCs 421-423 based UE roles. LTE network 400 comprises UEs 401-403, ENBs 411-413, and EPCs 421-423. Vehicle EPC 421 serves vehicle UEs with vehicle services. Critical IoT EPC 422 serves machine-operated UEs with high-quality wireless data communication services. Non-critical IoT EPC 423 serves machine-operated UEs with lower-quality but cheaper wireless data communication services. Vehicle EPC 421 comprises MME 431, S-GW 434, P-GW 437, and vehicle controller (CNT) 440. Critical IoT EPC 422 comprises MME 432, S-GW 435, P-GW 438, and machine database (DB) 441. Non-critical IoT EPC 423 comprises MME 433, S-GW 436, P-GW 439, and machine database 442.

UEs 401-403 are each configured with a role-based PLMN ID and a device role. The device roles for this specific PLMN ID are vehicle, critical IoT, and non-critical IoT—although other roles could be used. ENBs 411-413 each host data a structure that associates the vehicle device role with vehicle EPC 421, the critical IoT device role with critical IoT EPC 422, and the non-critical IoT device role with non-critical IoT EPC 423. ENBs 411-413 broadcast the role-based PLMN ID. UEs 401-403 respond to the multi-role PLMN ID by transferring LTE RRC attachment signaling to ENBs 411-413 that indicates their individual device role.

ENBs 411-413 process the device roles from the RRC attachment signaling to select the optimal EPCs 421-423. If the RRC attachment signaling indicates a vehicle device role, then ENBs 411-413 transmit the S1-MME initial UE attachment signaling to MME 431 in vehicle EPC 421. If the RRC attachment signaling indicates a critical IoT device role, then ENBs 411-413 transmit the S1-MME initial UE attachment signaling to MME 432 critical IoT EPC 422. If the RRC attachment signaling indicates a non-critical IoT device role, then ENBs 411-413 transmit the S1-MME initial UE attachment signaling to MME 433 non-critical IoT EPC 423. Additional device cores and device roles could be used. For example, a wireless relay EPC could be added to serve wireless relays.

Figure 5:
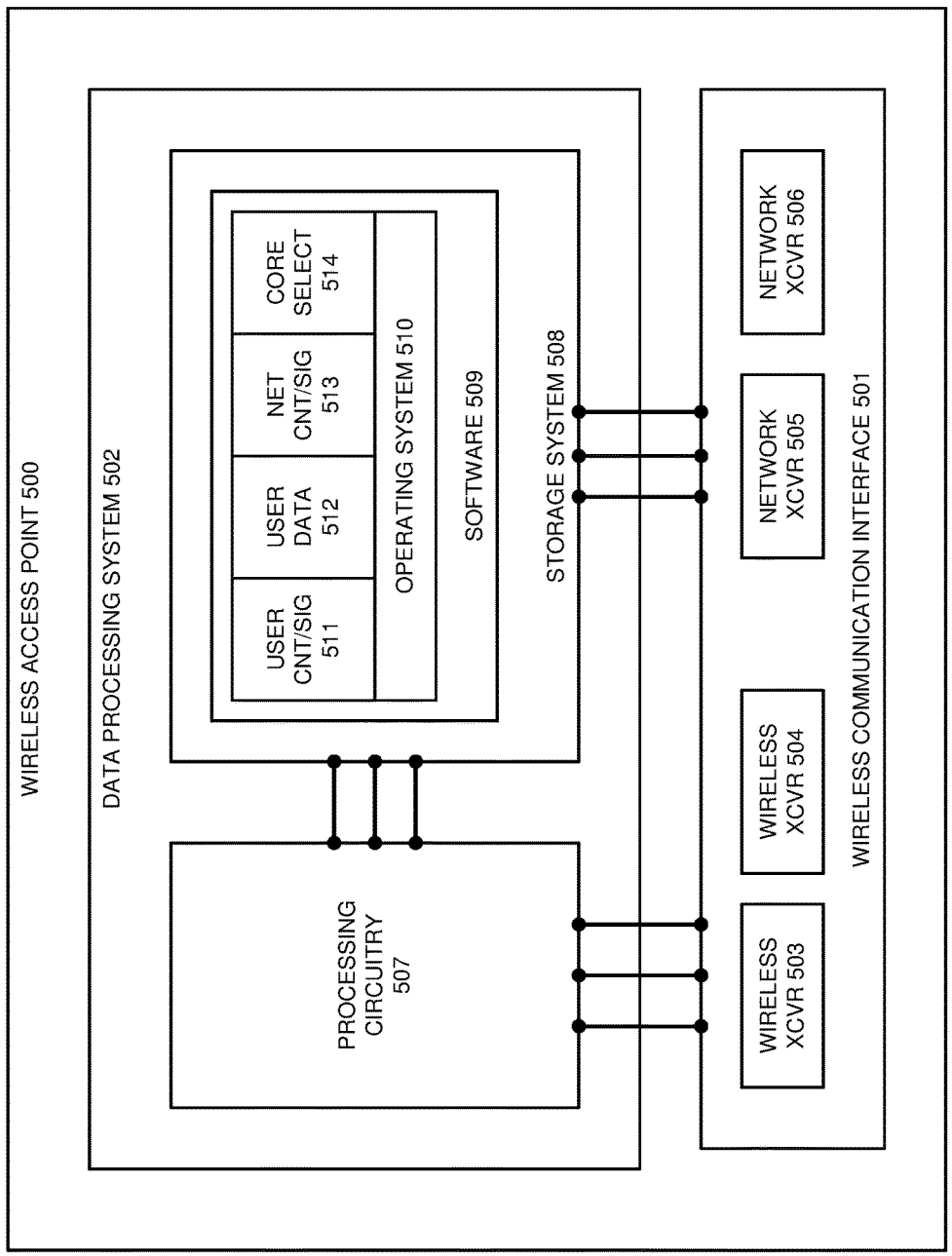
FIG. 5 illustrates a wireless access point to attach wireless communication devices to optimal wireless network cores based wireless communication device roles.

FIG. 5 illustrates wireless access point 500 to attach wireless communication devices to optimal wireless network cores based wireless communication device roles. Wireless access point 500 comprises wireless communication interface 501 and data processing system 502. Wireless communication interface 501 comprises transceivers (XCVRs) 503-506. Wireless XCVRs 503-504 comprise communication components such as antennas, amplifiers, filters, digital-to-analog interfaces, bus interfaces, memory, software, digital signal processors, and the like. Network XCVRs 505-506 comprise communication components such as digital-to-analog interfaces, bus interfaces, memory, software, digital signal processors, and the like.

Data processing system 502 comprises processing circuitry 507 and storage system 508. Storage system 508 stores software 509. Software 509 includes respective software modules 510-514. Processing circuitry 507 comprises CPUs and RAM. Storage system 508 comprises non-transitory, machine-readable, data storage media, such as RAM, flash drives, memory circuitry, and the like. Software 509 comprises machine-readable instructions that control the operation of processing circuitry 507 when executed.

When executed by processing circuitry 507, software modules 510-514 direct circuitry 507 to perform the following operations. Operating system 510 interfaces between software modules 511-514 and wireless access point 500 hardware. User control and signaling (CNT/SIG) modules 511 interact with wireless communication devices to identify wireless communication device roles and to control wireless data services. User data modules 512 perform the wireless data services for the wireless communication devices over transceivers 503-506. Network control and signaling modules 513 interact with multiple wireless network cores to control the wireless data services for the wireless communication devices. Core selection modules 514 select the optimal wireless network cores for the wireless communication devices based on their wireless communication device roles.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point that is linked to multiple wireless network cores to attach a wireless user device operated by a non-human machine to an optimal one of the wireless network cores, the method comprising:
   the wireless access point wirelessly transmitting a wireless network identifier for a wireless network that serves multiple device roles with different network cores;
   in response to wirelessly transmitting the wireless network identifier, the wireless access point wirelessly receiving device attachment signaling indicating a vehicle device role from the wireless user device operated by the non-human machine;
   the wireless access point processing the vehicle device role to select an optimal one of the wireless network cores that serves vehicles from the multiple wireless network cores;
   the wireless access point transferring network attachment signaling for the wireless user device operated by the non-human machine for delivery to the optimal one of the wireless network cores that serves vehicles;
   the wireless access point wirelessly receiving device attachment signaling indicating a wireless relay device role from the wireless user device operated by the non-human machine;
   the wireless access point processing the wireless relay device role to select an optimal one of the wireless network cores that serves wireless relays from the multiple wireless network cores; and
   the wireless access point transferring network attachment signaling for the wireless user device operated by the non-human machine for delivery to the optimal one of the wireless network cores that serves wireless relays.

2. The method of claim 1 further comprising:
   the wireless access point wirelessly receiving device attachment signaling indicating a device with critical communication requirements role from the wireless user device operated by the non-human machine;
   the wireless access point processing the device with critical communication requirements role to select an optimal one of the wireless network cores that serves devices with critical communication requirements; and
   the wireless access point transferring network attachment signaling for the wireless user device operated by the non-human machine delivery to the optimal one of the wireless network cores that serves devices with critical communication requirements.

3. The method of claim 1 further comprising:
the wireless access point wirelessly receiving device attachment signaling indicating a device with non-critical communication requirements role from the wireless user device operated by the non-human machine;
the wireless access point processing the device with non-critical communication requirements role to select an optimal one of the wireless network cores that serves devices with non-critical communication requirements; and
the wireless access point transferring network attachment signaling for the wireless user device operated by the non-human machine for delivery to the optimal one of the wireless network cores that serves devices with non-critical communication requirements.

4. The method of claim 1 further comprising:
the wireless access point wirelessly receiving device attachment signaling indicating an internet access without an independent voice calling service role from the wireless user device operated by the non-human machine;
the wireless access point processing the internet access without independent voice calling service role to select an optimal one of the wireless network cores that serves devices with internet access without independent voice calling service; and
the wireless access point transferring network attachment signaling for the wireless user device operated by the non-human machine for delivery to the optimal one of the wireless network cores that serves devices with internet access without independent voice calling service.

5. The method of claim 1 further comprising:
the wireless access point wirelessly receiving device attachment signaling indicating a media conferencing role from the wireless user device operated by the non-human machine;
the wireless access point processing the media conferencing role to select an optimal one of the wireless network cores that serves media conferencing devices; and
the wireless access point transferring network attachment signaling for the wireless user device operated by the non-human machine for delivery to the optimal one of the wireless network cores that serves media conferencing devices.

6. The method of claim 1 further comprising:
the wireless access point wirelessly receiving device attachment signaling indicating a utility meter role from the wireless user device operated by the non-human machine;
the wireless access point processing the utility meter role to select an optimal one of the wireless network cores that serves utility meter devices; and
the wireless access point transferring network attachment signaling for the wireless user device operated by the non-human machine for delivery to the optimal one of the wireless network cores that serves utility meter devices.

7. The method of claim 1 further comprising:
the wireless access point wirelessly receiving device attachment signaling indicating an environmental sensor role from the wireless user device operated by the non-human machine;
the wireless access point processing the environmental sensor role to select an optimal one of the wireless network cores that serves environmental sensor devices; and
the wireless access point transferring network attachment signaling for the wireless user device operated by the non-human machine for delivery to the optimal one of the wireless network cores that serves environmental sensor devices.

8. The method of claim 1 wherein the wireless access point hosts a data structure that associates the vehicle device role with the optimal one of the wireless network cores that serves vehicles from the multiple wireless network cores and associates the wireless relay device role with the optimal one of the wireless network cores that serves wireless relays from the multiple wireless network cores.

9. The method of claim 1 wherein the optimal one of the wireless network cores that serves vehicles comprises a vehicle Evolved Packet Core (EPC) and the optimal one of the wireless network cores that serves wireless relays comprises a wireless relay EPC.

10. The method of claim 1 wherein the device attachment signaling comprises Long Term Evolution (LTE) Radio Resource Control (RRC) signaling.

11. A wireless access point configured to be linked to multiple wireless network cores to attach a wireless user device operated by a non-human machine to an optimal one of the wireless network cores, the wireless access point comprising:
a wireless transceiver configured to wirelessly transmit a wireless network identifier for a wireless network that serves multiple device roles with different network cores and to wirelessly receive device attachment signaling indicating a vehicle device role from the wireless user device operated by the non-human machine responsive to wirelessly transmitting the wireless network identifier;
a data processing system configured to process the vehicle device role to select an optimal one of the wireless network cores that serves vehicles from the multiple wireless network cores and to generate network attachment signaling for the wireless user device for delivery to the optimal one of the wireless network cores that serves vehicles;
the wireless transceiver configured to transfer network attachment signaling for the wireless user device operated by the non-human machine for delivery to the optimal one of the wireless network cores that serves vehicles;
the wireless transceiver configured to wirelessly receive device attachment signaling indicating a wireless relay device role from the wireless user device operated by the non-human machine;
the data processing system configured to process the wireless relay device role to select an optimal one of the wireless network cores that serves wireless relays from the multiple wireless network cores; and
the wireless transceiver configured to transfer network attachment signaling for the wireless user device operated by the non-human machine for delivery to the optimal one of the wireless network cores that serves wireless relays.

12. The wireless access point of claim 11 wherein the wireless access point further comprises:
the wireless transceiver configured to wirelessly receive device attachment signaling indicating a device with critical communication requirements role from the wireless user device operated by the non-human machine;

the data processing system configured to process the device with critical communication requirements role to select an optimal one of the wireless network cores that serves devices with critical communication requirements; and the wireless transceiver configured to wirelessly transfer network attachment signaling for the wireless user device operated by the non-human machine for delivery to the optimal one of the wireless network cores that serves devices with critical communication requirements.

13. The wireless access point of claim 11 wherein the wireless access point further comprises:

the wireless transceiver configured to wirelessly receive device attachment signaling indicating a device with non-critical communication requirements role from the wireless user device operated by the non-human machine;

the data processing system configured to process the device with non-critical communication requirements role to select an optimal one of the wireless network cores that serves devices with non-critical communication requirements; and the wireless transceiver configured to wirelessly transfer network attachment signaling for the wireless user device operated by the non-human machine for delivery to the optimal one of the wireless network cores that serves devices with non-critical communication requirements.

14. The wireless access point of claim 11 wherein the wireless access point further comprises:

the wireless transceiver configured to wirelessly receive device attachment signaling indicating an internet access without an independent voice calling service role from the wireless user device operated by the non-human machine;

the data processing system configured to process the internet access without independent voice calling service role to select an optimal one of the wireless network cores that serves devices with internet access without independent voice calling service; and the wireless transceiver configured to wirelessly transfer network attachment signaling for the wireless user device operated by the non-human machine for delivery to the optimal one of the wireless network cores that serves devices with internet access without independent voice calling service.

15. The wireless access point of claim 11 wherein the wireless access point further comprises:

the wireless transceiver configured to wirelessly receive device attachment signaling indicating a media conferencing role from the wireless user device operated by the non-human machine;

the data processing system configured to process the media conferencing role to select an optimal one of the wireless network cores that serves media conferencing devices; and the wireless transceiver configured to wirelessly transfer network attachment signaling for the wireless user device operated by the non-human machine for delivery to the optimal one of the wireless network cores that serves media conferencing devices.

16. The wireless access point of claim 11 wherein the wireless access point further comprises:

the wireless transceiver configured to wirelessly receive device attachment signaling indicating a utility meter role from the wireless user device operated by the non-human machine;

the data processing system configured to process the utility meter role to select an optimal one of the wireless network cores that serves utility meter devices; and the wireless transceiver configured to wirelessly transfer network attachment signaling for the wireless user device operated by the non-human machine for delivery to the optimal one of the wireless network cores that serves utility meter devices.

17. The wireless access point of claim 11 wherein the wireless access point further comprises:

the wireless transceiver configured to wirelessly receive device attachment signaling indicating an environmental sensor role from the wireless user device operated by the non-human machine;

the data processing system configured to process the environmental sensor role to select an optimal one of the wireless network cores that serves environmental sensor devices; and the wireless transceiver configured to wirelessly transfer network attachment signaling for the wireless user device operated by the non-human machine for delivery to the optimal one of the wireless network cores that serves environmental sensor devices.

18. The wireless access point of claim 11 wherein the wireless data processing system is configured to host a data structure that associates the vehicle device role with the optimal one of the wireless network cores that serves vehicles from the multiple wireless network cores and associates the wireless relay device role with the optimal one of the wireless network cores that serves wireless relays from the multiple wireless network cores.

19. The wireless access point of claim 11 wherein the optimal one of the wireless network cores that serves vehicles comprises a vehicle Evolved Packet Core (EPC) and the optimal one of the wireless network cores that serves wireless relays comprises a wireless relay EPC.

20. The wireless access point of claim 11 wherein the device attachment signaling comprises Long Term Evolution (LTE) Radio Resource Control (RRC) signaling.

* * * * *